United States Patent [19]
Ridenour

[11] Patent Number: 5,293,771
[45] Date of Patent: Mar. 15, 1994

[54] GAS LEAK SENSOR SYSTEM

[76] Inventor: Ralph G. Ridenour, 626 Lexington-Ontario Rd., Mansfield, Ohio 44903

[21] Appl. No.: 938,820

[22] Filed: Sep. 1, 1992

[51] Int. Cl.$^5$ ............................................. G01M 3/26
[52] U.S. Cl. ............................................ 73/40; 340/605
[58] Field of Search ............... 73/40, 49.2; 340/605, 340/632

[56] References Cited

U.S. PATENT DOCUMENTS

| | | |
|---|---|---|
| 2,826,044 | 3/1958 | Reer . |
| 3,043,145 | 7/1962 | Hoffman . |
| 3,234,749 | 2/1966 | Quick . |
| 3,357,257 | 12/1967 | Herndon et al. ............. 73/40 X |
| 3,921,457 | 11/1975 | Barnes, Jr. et al. . |
| 4,612,775 | 9/1986 | Branz et al. . |
| 5,009,076 | 4/1991 | Winslow . |

FOREIGN PATENT DOCUMENTS

| | | | |
|---|---|---|---|
| 2276577 | 1/1976 | France ................................ | 73/40 |
| 83832 | 6/1980 | Japan ................................. | 73/40 |
| 84127 | 3/1989 | Japan ................................. | 73/40 |

Primary Examiner—Hezron E. Williams
Assistant Examiner—Joseph W. Roskos
Attorney, Agent, or Firm—Pearne, Gordon, McCoy & Granger

[57] ABSTRACT

A gas leak sensor system detects the presence of gas leaking into any one of a plurality of test spaces for example, refrigeration gas into a refrigeration case. A plurality of tubes extend from each of the test spaces to a sensor location whereat a selector valve is connected to each tube. A controller actuates the selector valves to select tubes in a particular order and a vacuum source draws air and any leaking gas through a selected tube and through a gas sensor to activate an alarm. The gas sensor is purged at least each time a leaking gas has been sensed.

14 Claims, 1 Drawing Sheet

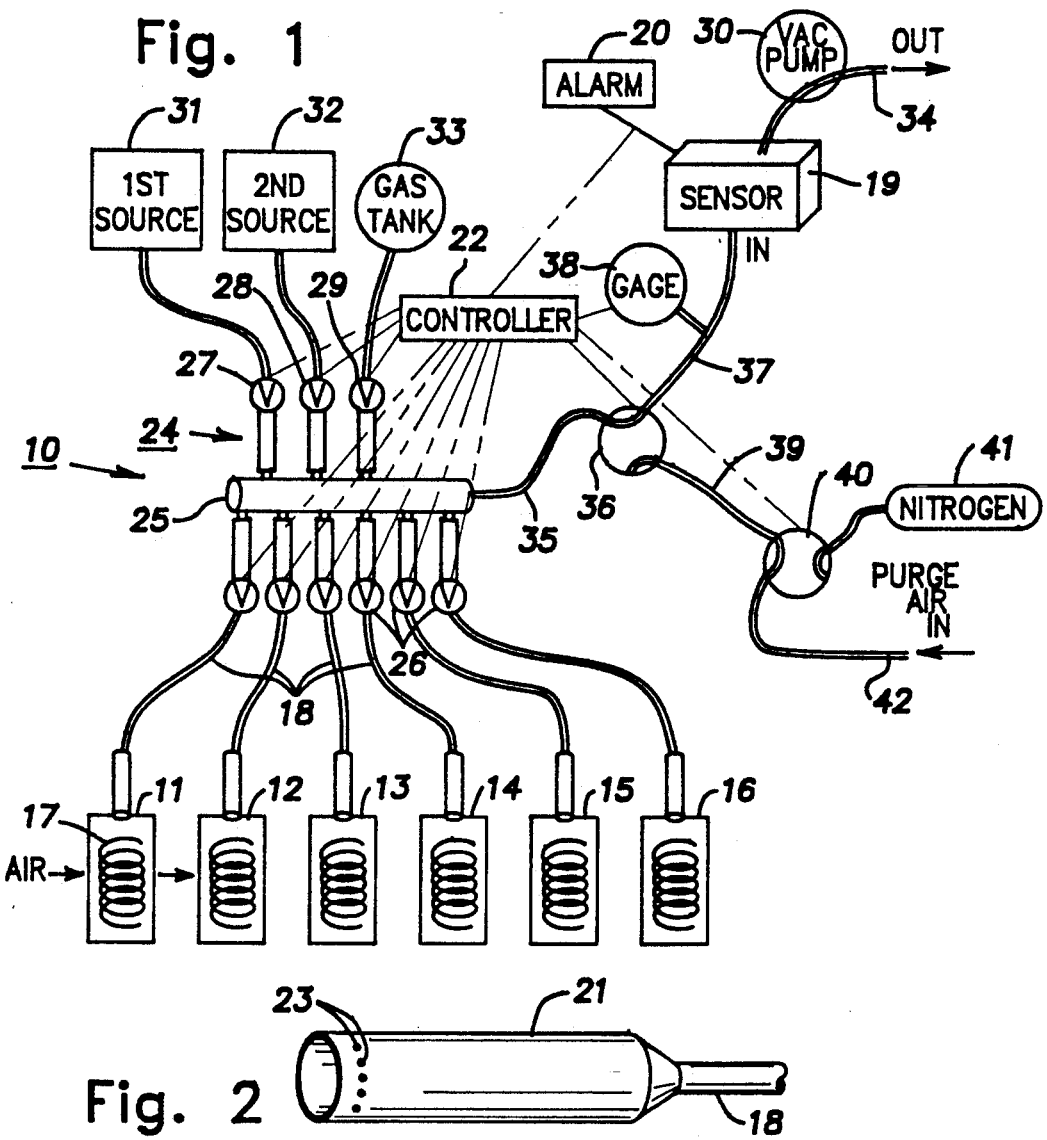
Fig. 1
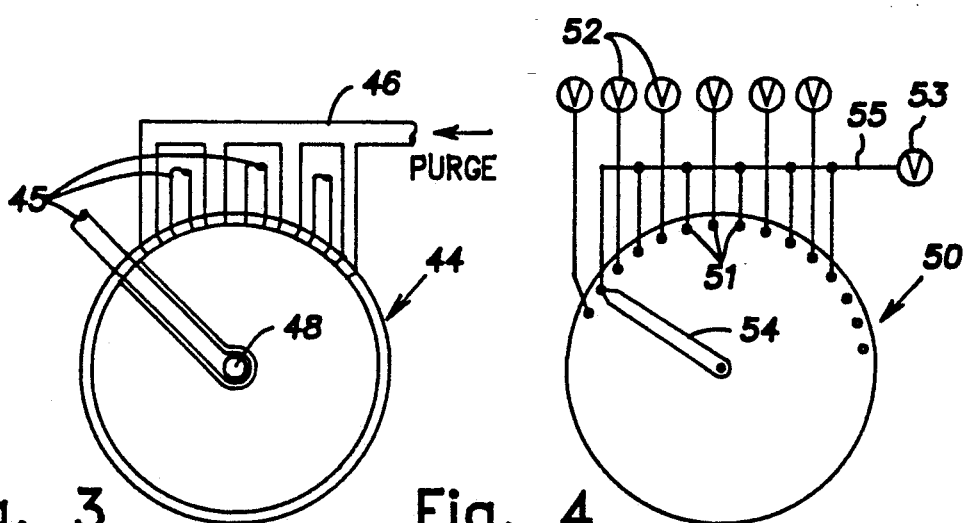
Fig. 2
Fig. 3
Fig. 4

GAS LEAK SENSOR SYSTEM

BACKGROUND OF THE INVENTION

Supermarkets and warehouses have many isolated refrigeration coils where potential leaks can occur. Individual sensing devices at each location would be cost prohibitive. U.S. Pat. No. 3,357,257 discloses the concept of a plurality of test spaces with tubing leading from the test spaces through valves to a single gas sensor, but no means for purging the system is disclosed.

SUMMARY OF THE INVENTION

A gas leak sensor system detects the presence of gas leaking into any one of a plurality of test spaces and includes a plurality of tubes extending from each of the test spaces to a sensor location. Selector valve means are connected to each tube and a gas sensor has an alarm. Control means is connected to actuate the selector valve means to select tubes in a particular order, means is connected to the selector valve means to draw air and any leaking gas through the selected tube and through the gas sensor, and means to purge said gas sensor at least when leaking gas has been sensed. Accordingly, a gas leak sensor system is disclosed which can sense a plurality of test spaces with a means to purge the gas sensor after the sensing of leaking gas.

Another object of the invention is to provide a purging means which uses outside air from a location separate from the discharge from said gas sensor.

Other objects and a fuller understanding of the invention may be had by referring to the following description and claims, taken in conjunction with the accompanying drawings.

BRIEF DESCRIPTION OF THE DRAWINGS

FIG. 1 is a schematic diagram of the gas leak sensor system according to the invention;

FIG. 2 is an enlarged view of the termination of an individual tube at a test space;

FIG. 3 is a plan view of a rotary gas valve; and

FIG. 4 is a plan view of a rotary selector switch.

DESCRIPTION OF THE PREFERRED EMBODIMENTS

FIG. 1 illustrates a gas leak sensor system 10 embodying the invention. This sensor system detects the presence of any gas leaking from a plurality of test spaces 11–16, respectively. These may be confined spaces such as a refrigeration case with a refrigeration coil 17 therein and with some means to direct air over the coil 17 as shown in FIG. 1. A plurality of tubes 18 extend from each of the test spaces to a sensor location which is preferably at a central location. A leaking gas sensor 19 is at this sensor location and is designed to detect the presence of any leaking gas. In this particular embodiment this would be a refrigerant gas such as one of the freon gases. The gas sensor 19 has an alarm 20, which may be visible or audible or both. A controller 22 controls a group of selector valves 24. In this embodiment these may be solenoid actuated valves all connected to a manifold 25. One group of valves 26 is connected one each in each of the tubes 18 leading to the test spaces. These valves are preferably at the sensor location. Valves 27, 28, and 29 are connected between the manifold and a first gas source 31, a second gas source 32, and a gas tank 33, respectively. Each of these sources and the gas tank are sources of the same gas which the sensor 19 tests for leaks. A vacuum pump 30 is a means connected to draw air out of the sensor 19 and to eject it to outside air at a first location 34. A conduit 35 leads from the manifold 25 through a three-way valve 36 and a conduit 37 to the gas sensor 19. A vacuum gauge 38 is connected to the conduit 37. A conduit 39 connects an input of the three-way valve 36 with another three-way valve 40 to which a nitrogen tank 41 is connected as well as a purge air input from the outside air at 42 which is at a second location remote from the first location 34 so that there is no mixing of air outlet from the vacuum pump with the purge air input.

FIG. 2 shows the construction of the tubes such as tube 18 as it terminates at one of the test spaces 11–16. The small diameter tube may be a flexible plastic tube, e.g. ¼" diameter, but at the termination end shown in FIG. 2 the tube is enlarged to perhaps 1" diameter for the terminal end 21.

In operation, the circuit of FIG. 1 is controlled by the controller 22, which preferably is a central processing unit or CPU to control the various valves of the selector valve means 24. The vacuum pump 30 draws air from the test spaces 11–16 which in this example is a refrigerated coil environment which may be subject to leaks of the refrigerant gas. The vacuum pump draws air through the gas sensor 19 and exhausts this air to the outside at the first location 34. After the first test space 11 has been tested, then the controller controls the three-way valve 33 so that purge air is drawn in from the second outside location 42 to purge the sensor of any remaining gas therein. The next selected test space is chosen by opening the proper valve 26 and this might be the test space 12. The vacuum pump draws the air from this test space through the gas sensor to determine if there is any gas leaking in this test space 12. Next, again, the three-way valve 36 is actuated to draw purge air through the gas sensor. This purging occurs each time a different tube is selected and whenever the sensor detects refrigerant. If refrigerant gas is detected, then the gas sensor is purged with air and that same test space is again tested before the alarm 20 is activated. This helps eliminate false readings and to make sure that a leak is detected in the correct tube. When for some strange reason freon is sensed from the outside air source, a special alarm sounds and the system shuts down. In this case the system 10 can shift to and sample an inert gas such as nitrogen from the tank 41 by activating the three-way valve 40. An alarm will also sound when the tank pressure is too low to provide sufficient purging gas.

When the system is first started, the vacuum pump 30 is activated and monitored for correct amount of the vacuum. If the vacuum is not correct, the system alarms and shuts down or an alternate vacuum source is selected. If vacuum is correct, the system samples the first outside gas source 31 and verifies correct operation. If not correct, the alternate second source 32 is sampled. If this is still not correct, the compressed tank source 33 is sampled and verified. If verification is o.k., the system continues in operation, but an alarm is registered that this source is being used as it is exhaustible.

Next the port selection solenoid valves 26 are activated in a given order and each monitored port is selected and sampled for a period of time. If the port is free from contaminated gas, the next port is sequentially selected until all ports are selected in turn. After each port is sampled, or after each port is sampled which has a gas leak detected, the purge gas is selected to cleanse the sensor to insure that the new port selected starts out with a cleanly purged sensor to help eliminate spurious readings. Should a port indicate that it has contaminated gas present, then the control system stays at that particular port, shuts off that port, and then selects the purge port to cleanse the sensor. The system then tries the contaminated port again and if the level of gas is still above alarming conditions, the system then sends out its alarm to alert personnel of a gas leak. The system shuts off that port, purges the sensor, and then selects the next sequential port. It may be the case that several refrigeration coils or refrigeration cases could be connected in series together sharing the same environment so that several alarms could come from a single refrigerant leak.

As shown in FIG. 2 the terminal end of each tube at the test space is enlarged and this prevents frost from plugging the end of the ¼" tubing, without need for use of a heater. This enlarged terminal area collects the frost until the refrigerated coil goes through a defrost cycle. Should the end of the tube plug up for whatever reason, then the vacuum gauge 38 in the circuit registers too much of a vacuum and alarms the circuit of an indication that the tube is not sampling the monitored air. Also the gauge 38 can be set for the opposite of that condition which would be an open or cut tube. By having the manifold at a central location, this can establish substantially equal vacuum amounts for each test space so that they all read approximately the same amount of vacuum. Then when a portion of the tube resistance is missing, the vacuum gauge notes the difference in resistance and alarms the circuit.

The controller 22 has a timer so that once every 24 hours a calibrated leak from the first source 31 or gas tank 33 is sampled. If the systems responds properly to the calibrated leak, the normal sequence of operation continues. Should the sensor system 10 not respond to this leak, the system shuts down and alarms.

FIG. 3 illustrates a type of gatling gun rotary valve 44 with a plurality of tubes 45 leading to the various test spaces 11-16. A purge air inlet manifold 46 is connected to alternate ones of the conduits around the periphery of the rotary valve 44. The center 48 of the gas valve leads to the gas sensor 19. This therefore becomes the selector valve means in place of the selector valve means 24 of FIG. 1. In use, the selector valve 44 rotates in one direction to test each test space in sequence with the gas sensor 19 being purged of any contaminated gas in between each testing of a test space.

FIG. 4 is a similar system with a rotary selector switch 50. A rotary arm 54 can rotate among a plurality of contacts 51. Alternate ones of these contacts go to individual solenoid actuated valves 52 which select individual conduits going to the different test spaces 11-16. Alternate ones of these contacts 51 lead to a common conductor 55 which energizes a purge valve 53. Again the rotation of the selector arm 54 in a given direction will individually test the various test spaces 11-16 with purging between each testing of a test space.

The present disclosure includes that contained in the appended claims, as well as that of the forgoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A gas leak sensor system for detecting the presence of gas leaking into any of a plurality of test spaces, comprising, in combination:
   a plurality of tubes extending from each of the test spaces to a sensor location;
   selector valve means connected to each tube;
   a gas sensor having an alarm;
   control means to actuate said selector valve means to select tubes in a particular order;
   means connected to the selector valve means to draw air and any leaking gas through the selected tube and through the gas sensor;
   means to purge said gas sensor at least when leaking as has been sensed; and
   said purging means having a purging gas inlet remote from said test spaces.

2. A gas leak sensor system as set forth in claim 1, wherein said purging means purges said gas sensor to outside air at a first location.

3. A gas leak sensor system as set forth in claim 2, wherein said purging means has an air inlet remote from said first location.

4. A gas leak sensor system as set forth in claim 1, wherein said purging means purges said gas sensor with outside air after each sensing of a selected tube.

5. A gas leak sensor system as set forth in claim 1, wherein said selector valve means are grouped at said sensor location.

6. A gas leak sensor system as set forth in claim 1, including an air inlet connected to outside air in said purge means and connected through said selector valve means to said sensor so that when the valve means is open outside air purges said sensor.

7. A gas leak sensor system as set forth in claim 1, including said alarm connected to said gas sensor to provide an alarm upon sensing gas in the gas sensor.

8. A gas leak sensor system as set forth in claim 1, including said sensor having an output to said control means to control said selector valve means.

9. A gas leak sensor system as set forth in claim 8, wherein said control means controls said selector valve means to check twice for gas leaking into a given test space prior to giving an alarm.

10. A gas leak sensor system as set forth in claim 8, wherein said control means controls said selector valve means to purge said gas sensor in between two drawings of air from a given test space before giving an alarm of leaking gas.

11. A gas, leak sensor system as set forth in claim 1, including vacuum gauge means in communication with said sensor.

12. A gas leak sensor system as set forth in claim 1, wherein said drawing means is a vacuum pump.

13. A gas leak sensor system as set forth in claim 1, wherein said particular order of said selected tubes is to alternate a selected tube with the selection of said purging means.

14. A gas leak sensor system as set forth in claim 1, wherein said purge means includes an inert gas.

* * * * *

UNITED STATES PATENT AND TRADEMARK OFFICE
CERTIFICATE OF CORRECTION

PATENT NO.  : 5,293,771

DATED       : March 15, 1994

INVENTOR(S) : Ralph G. Ridenour

It is certified that error appears in the above-identified patent and that said Letters Patent is hereby corrected as shown below:

Claim 1, column 4, line 19 "as" should be --gas--.

Signed and Sealed this

Eighteenth Day of October, 1994

Attest:

BRUCE LEHMAN

Attesting Officer

Commissioner of Patents and Trademarks